(12) United States Patent
Koivula

(10) Patent No.: US 6,596,165 B2
(45) Date of Patent: Jul. 22, 2003

(54) FILTERING APPARATUS

(75) Inventor: Tuomo Koivula, Tampere (FI)

(73) Assignee: Parker Hannifin Oy, Urjala (FI)

( * ) Notice: Subject to any disclaimer, the term of this patent is extended or adjusted under 35 U.S.C. 154(b) by 0 days.

(21) Appl. No.: 10/090,513

(22) Filed: Mar. 4, 2002

(65) Prior Publication Data
US 2002/0092805 A1 Jul. 18, 2002

Related U.S. Application Data

(63) Continuation of application No. PCT/FI00/00795, filed on Sep. 20, 2000.

(30) Foreign Application Priority Data

Sep. 20, 1996 (FI) .............................. 19991996

(51) Int. Cl.$^7$ ............................... B01D 29/68
(52) U.S. Cl. .............. 210/323.2; 210/333.1; 210/411; 210/415
(58) Field of Search ................ 210/168, 171, 210/323.1, 323.2, 333.01, 333.1, 334, 411, 413, 414, 415, 427, 497.01

(56) References Cited

U.S. PATENT DOCUMENTS

| | | | |
|---|---|---|---|
| 2,772,786 A | * 12/1956 | Gardes | 210/333.01 |
| 3,176,846 A | * 4/1965 | Adams | 210/333.1 |
| 3,318,452 A | 5/1967 | Adams | |
| 3,476,248 A | * 11/1969 | Adams | 210/153 |
| 3,703,465 A | 11/1972 | Reece et al. | |

FOREIGN PATENT DOCUMENTS

| | | | | |
|---|---|---|---|---|
| DE | 43 40 275 A1 | 6/1995 | | |
| RU | 2064323 | 7/1996 | | |
| RU | 2082484 | 6/1997 | | |
| SU | 1503858 | * 8/1989 | ........ | B01D/27/12 |
| WO | WO 01/21277 A1 | 9/2000 | ........ | B01D/29/11 |

* cited by examiner

Primary Examiner—Matthew O. Savage
(74) Attorney, Agent, or Firm—Christopher H. Hunter

(57) ABSTRACT

A backflushable filtering apparatus for fuel or luboil filter of a motor includes inlet and outlet flow channels, parallel filtering elements open from their ends, in which infiltration occurs from through their jackets, and washing organs at different ends of the filtering elements, the organs connecting alternately to different ends of the filtering elements to provide discharge channels for the backflushing of elements generated by the pressure of the filtered flow. Each of the filtering elements is divided in two by a solid partition or constriction between its ends so that the connected washing organ generates backflushing only to a part of the element length at a time. The parts of the filtering element are functionally independent, and the one part may be backflushed at the same time as the filtering goes on in the other part.

12 Claims, 5 Drawing Sheets

FILTERING APPARATUS

CROSS REFERENCE TO RELATED APPLICATIONS

This application is a continuation of co-pending International Application No. PCT/FI00/00795, filed Sep. 20, 2000, which designated the United States, and claims priority to Finish Patent Application 19991996, filed Sep. 20, 1999, the disclosures of which are incorporated herein by reference.

FIELD OF THE INVENTION

The invention relates to a filtering apparatus, comprising an inlet channel for the flow to be filtered, an outlet channel for the filtered flow, a number of parallel filtering elements open from both ends, into which the flow to be filtered may be directed so that the infiltration occurs out of the element through the element jacket, and at least one washing organ connecting alternately to the ends of different elements at both ends of the filtering elements, forming an outlet channel for the backflushing of elements generated with the pressure of the filtered flow.

BACKGROUND OF THE INVENTION

A filtering device is needed especially in motors as a fuel or luboil filter, with the continuous backflushing of which the operation of the motor is ensured in long-term continuous use. The apparatus typically comprises a large number of filtering elements, which are continuously in operation except for the washing period running in a few elements at a time.

A state-of-the art backflushable filtering apparatus has been described in the patent publication DE-4 340 275. The apparatus comprises parallel, candle-shaped filtering elements arranged around a vertical axle as two nested rings. The flow to be filtered is directed into the elements from their upper and lower ends, and the infiltration occurs out of the element through the cylindrical jacket of each element. For backwashing the elements, two washing arms of different lengths are arranged below them, the arms being fastened to the rotatable vertical axle of the apparatus. The rotating motion of the axle and the washing arms is achieved with the help of a turbine rotor arranged in the flow inlet channel and cogwheels connected to the rotor and acting as transmission mechanism. The movement of the washing arms is thus maintained by utilising the motion energy of the flow coming into the apparatus. The washing arms are arranged to alternately connect to the lower ends of different filtering elements so that they form outlet channels for the washing flow. Corresponding to the elements, closers are attached to the rotatable axle of the apparatus above the filtering elements, the closers shutting the upper end of the filtering element in question during the washing stage, thus preventing the flow to be filtered from mixing with the washing flow.

The drawback of the backflushing arranged according to the publication DE-4 340 275 is in practice that the filtering elements are cleaned well only from their lower ends, in which the washing suction has the strongest effect. The situation is made worse by the fact that the flow is channelled to a place in which the flow resistance is the smallest, i.e. the washing arms absorb liquid from the lower ends of the elements being cleaned or already cleaned at the same time as the upper ends of the elements remain more or less without washing.

One has tried to solve the said problem by leaving a small opening to the upper end of the filtering element to be washed for the flow-through of washing liquid. In other words, the intention is to complete backflushing with a washing flow sweeping the inner surface of the element jacket. However, as the countercurrent flow penetrating the element jacket is substantially more effective in releasing the precipitate gathered into the jacket than the flow-through inside the jacket, and as the flow-through may in its part deter the countercurrent flow penetrating the jacket, the improvement achieved with the solution remains imperfect.

The patent publication U.S. Pat. No. 3,318,452 discloses a filtering apparatus, in which washing arms are arranged to the opposite ends of the filtering candles, the arms linking simultaneously to the ends of the candles. This makes the backflushing more effective in the vicinity of the candle ends, but in the middle part of the candle the suctions directed to opposite directions annul each other so that washing is weaker in this part of the candle.

SUMMARY OF THE INVENTION

The object of the invention is to remove the drawbacks in the state-of-the-art technology and to provide a filtering apparatus, in which the backflushing of filtering elements may be carried out in a more effective way than before. It is characteristic of the filtering apparatus of the invention that each of the filtering elements is divided into two parts between the ends so that the washing organ connected to the end of the element creates backflushing only to a part of the element length at a time.

In the filtering element of the invention, each filtering element can be washed with a washing suction directed to its both ends so that the element parts experience identical washing, and the cleaning effect of the washing directed to the element jacket becomes substantially more effective. With this arrangement, the problem of the filtering apparatus of the publication DE-4 340 275, i.e. that the other end of the filtering element continuously suffers poor washing, is avoided.

By dividing the filtering element in two in accordance with the invention, it is especially achieved that the washing is directed only to a part of the whole jacket surface of the element, which means more effective washing. A further advantage is that the element parts can now be flushed independently irrespective of each other, and it is not necessary to separately close the opposite end of the element when washing the other part of the element. On the contrary, the filtering may continue in the one part of the element as the other part is washed, which increases the capacity of the apparatus.

Connecting the filtering element to the washing suction alternately from its different ends may also generate an impulse directed to the element, assisting in releasing the cake of solid matter collected to the element jacket and thus in cleaning the element.

The said division of the filtering element in two may be carried out substantially by a solid partition arranged to the middle of the element. The element is then divided into two parts, which are operationally independent from each other. Alternatively, the interior of the filtering element may be constricted from between the ends so that there is a narrow flow opening in the constriction point, letting the washing flow-through to the element part which is to be backflushed. For example, it is possible to provide the element with a partition, to which an inclined or curved flow opening is formed so that it generates a spiral flow-through into the element part to be washed. This kind of arrangement has a substantially bigger cleaning effect to the inner surface of the element than a direct linear flow-through.

In the filtering apparatus of the invention, the washing elements at the opposite ends of the filtering elements may advantageously be connected to each other as one piece rotating around the axle of the apparatus. No additional mechanisms for generating the rotating movement of the different washing elements are thus needed.

The washing elements may be tubular washing arms transverse to the direction of the filtering elements. The filtering elements may be arranged as one or several rings around the rotation axle of the washing arms. Respectively, one or several washing arms are needed at both ends of the elements, the length of the arms corresponding to the radii of the said rings. Upon rotating, each washing arm connects alternately to the ends of different elements for generating the backflushing of the elements.

The common rotation axle for the washing organs of the different ends of the said filtering elements is preferably provided with a channel, through which all the washing elements are in connection with the same discharge assembly. The said axis, as well as the washing organs, may consist of hollow tubes, along which the washing flow is discharged. The discharge assemblies may be in the ambient pressure so that the washing works with the pressure difference between the pressure of the filtered flow surrounding the filtering elements and the ambient pressure.

The washing organs at the opposite ends of the filtering elements may be arranged opposite each other so that they connect simultaneously to each filtering element, thus generating the washing of the element with the washing suction simultaneously from both ends. However, it is as well possible to arrange the washing organs to connect to different ends of each of the filtering elements at different stages.

DETAILED DESCRIPTION OF THE PREFERRED EMBODIMENT

Figure 1:
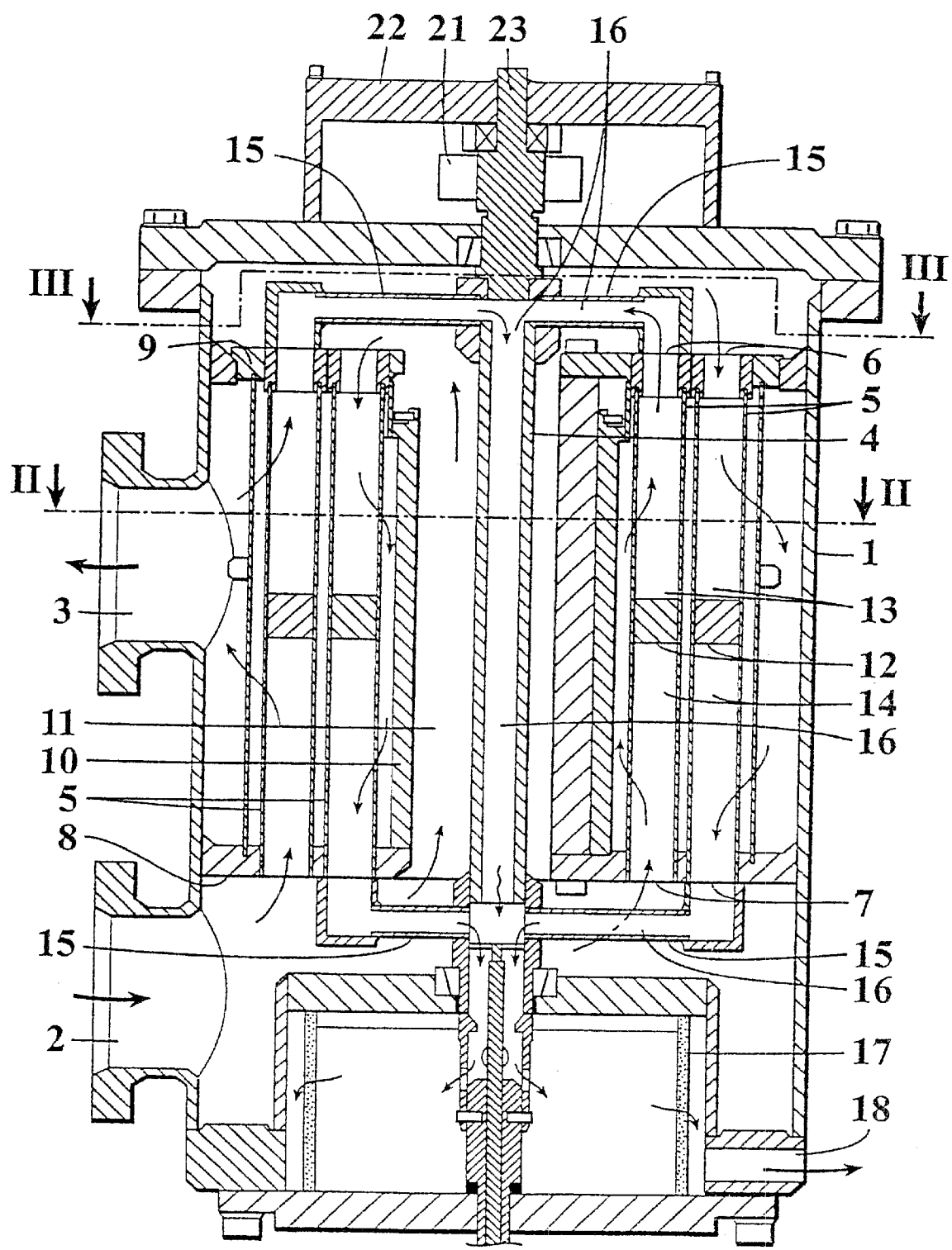
FIG. 1 is a vertical section of a filtering apparatus of the invention, comprising a number of filtering elements and washing arms at their opposite ends.
Figure 2:
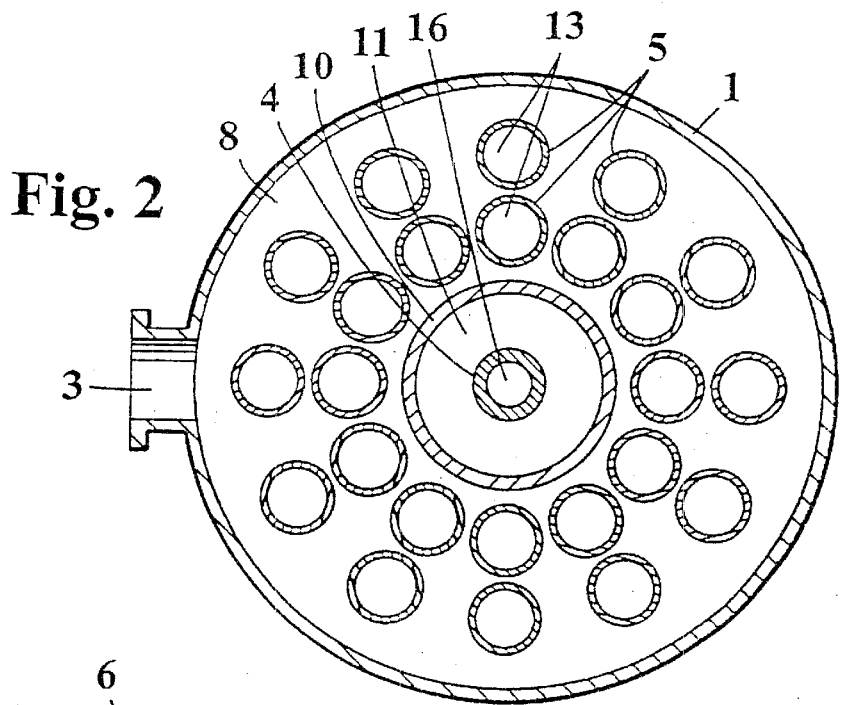
FIG. 2 is a horizontal section II—II of FIG. 1, in which parallel filtering elements of the apparatus are shown.
Figure 3:
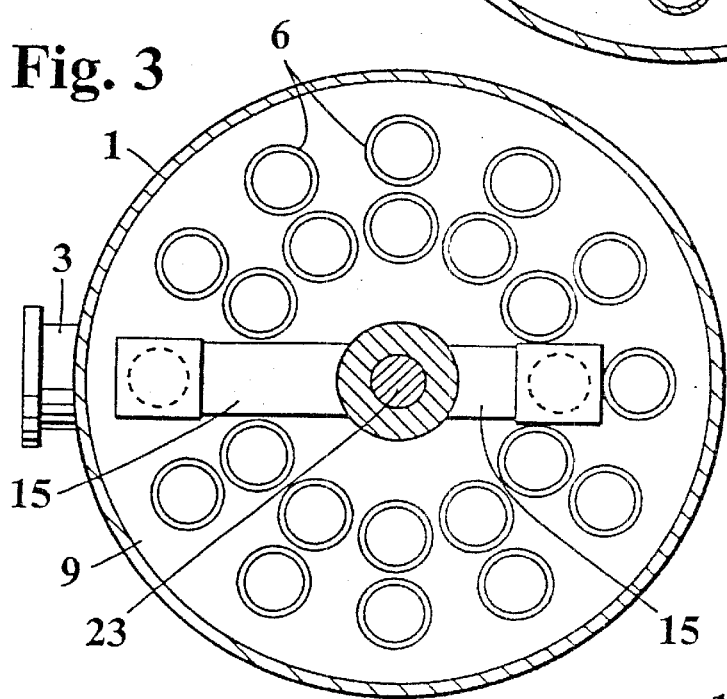
FIG. 3 is a horizontal section III—III of FIG. 1, in which parallel filtering elements and washing arms above them are shown.

FIGS. 1–3 show a filtering apparatus, which may act, for example, as a lubricant oil filter of a diesel motor, continuously filtering oil as the motor is running. The apparatus comprises a jacket 1, an inlet channel 2 for the flow to be filtered, an outlet channel 3 for the filtered flow, and a number of longitudinal, candle shaped filtering elements 5 arranged around the middle axle 4 of the apparatus as two nested rings. The jackets of the elements 5 are made of porous filtering material, which keeps away the solid particles and other impurities in the flow as the flow is directed from the interior of the elements out of the elements through the jacket. For directing the flow to be filtered into the elements 5, each element is open both from its upper end 6 and its lower end 7. Gaps between the ends 6, 7 of adjacent filtering elements are closed with a horizontal plate 8, 9 both at the lower and upper end of the elements.

The plates 8, 9 are additionally attached to each other with a vertical, cylindrical wall 10, which defines a vertical flow channel 11 for the flow to be filtered into its interior. Thus, the flow can spread to the space defined by the jacket 1, from where it is transferred into the elements through the open ends 6, 7 of the filtering element 5, directed out of the elements through the element jackets, and discharged in a cleaned state to the outlet channel 3.

In the apparatus of FIG. 1, each one of the candle-shaped filtering elements 5 is divided in two from the middle by a horizontal, solid partition 12. Each element 5 thus comprises an upper part 13 open from its upper end and a lower part 14 open from its lower end, through which the flows to be filtered travel independent from each other.

During the filtering process, the solid matter gathering to the inner surfaces of the jackets of the filtering elements 5 gradually blocks the pores of the jacket, thus causing a decrease in the filtering capacity. For maintaining the operation of the elements, the apparatus is provided with backflushing, which is carried out by the pressure of the filtered flow to the direction opposite to the flow to be filtered through the element jackets, i.e. from outside the jackets to their interior. Washing arms 15 are arranged above and below the parallel elements 5, connecting alternately to the ends 6, 7 of the different elements, for connecting the elements to a lower pressure for generating the washing flow. Both above and below the elements there are two washing arms 15, the lengths of which correspond to the radii of the nested rings formed by the elements. The washing arms consist of a hollow tube, and they are fastened to the also hollow middle axle 4 of the apparatus so that these together act as discharge channels 16 for the washing flow cleaning the element. The discharge channels 16 are directed to the lower part of the apparatus, from which the washing flow is discharged after flowing through the filter 17 to the discharge assembly 18 which is, for example, suitably in the atmospheric pressure.

In the apparatus described, the backflushing works so that the axle 4 with its washing arms 15 attached to it performs a rotary movement, for example, counter-clockwise so that the washing arms alternately connect from their ends to different ends 6, 7 of different filtering elements, thus connecting the interiors of the elements in question to a pressure which is lower than the pressure of the filtered flow of the washing channels 16 and the discharge assembly 18, thus generating backflushing. The washing occurs in the part between the end of the element 5 and the partition 12 at the same time as the opposite end of the element is open so that filtering may continue in the part restricting to the open end of the element. Thus, FIG. 1 presents a situation in which filtering continues in the lower part 14 of the element farthest at the left, as the upper part 13 of the element experiences backwashing, and filtering continues in the upper part 13 of the element farthest at the right at the same time as the lower part 14 of the element undergoes backflushing. In addition, filtering is naturally conducted continuously in those filtering elements, which are not connected to the washing arms 15. During the process, the lower part and the upper part of each of the filtering elements is cleaned with backflushing at regular intervals so that the filtering capacity of the whole apparatus remains substantially constant in the process.

Figure 4:
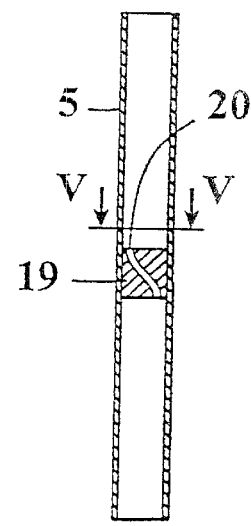
FIG. 4 presents a single filtering element as an embodiment of the invention, the partition in the middle of the element having a spiral flow-through opening.
Figure 5:
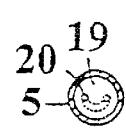
FIG. 5 is a section V—V of the filtering element in FIG. 4.

In FIGS. 4 and 5, there is shown a variation of the candle-shaped filtering element 5 used in the invention, in which, instead of a solid partition, the element is divided in two with a choker 19, in which there is provided a spiral flow opening 20 connecting the upper and lower parts 13, 14 of the element to each other. Besides backflushing, the opening 20 generates also a spirally directed washing flow-through to the part of the element 5 undergoing washing. Otherwise the operation and use of the element in connection with filtering and washing correspond to the above presentation.

It is technically possible to realise the rotary movement of the construction formed by the axle 4 of the apparatus and the washing arms 15 rigidly fastened to it in several different ways. It is preferable to arrange the rotating organs 21, which are shown only schematically in FIG. 1, outside the filtering space defined by the jacket 1 of the apparatus, in FIG. 1 to the casing 22 above the jacket, into which the rotating axle is extended. The extension of the axle is indicated with the reference number 23 in the figure. The rotating apparatus 21 may be an actuator using an external power source, performing either a stepping or a continuous rotating movement. However, the rotation may most advantageously be achieved by utilising the pressure of the incoming flow to be filtered or the pressure of the outgoing filtered flow. A preferable solution based on the pressure difference between the latter and the external pressure is disclosed in the parallel international patent application PCT/FI00/00800, filed Sep. 20, 2000, which was filed simultaneously with the present application, and which is with this reference enclosed as part of the specification of the present application.

Figure 6:
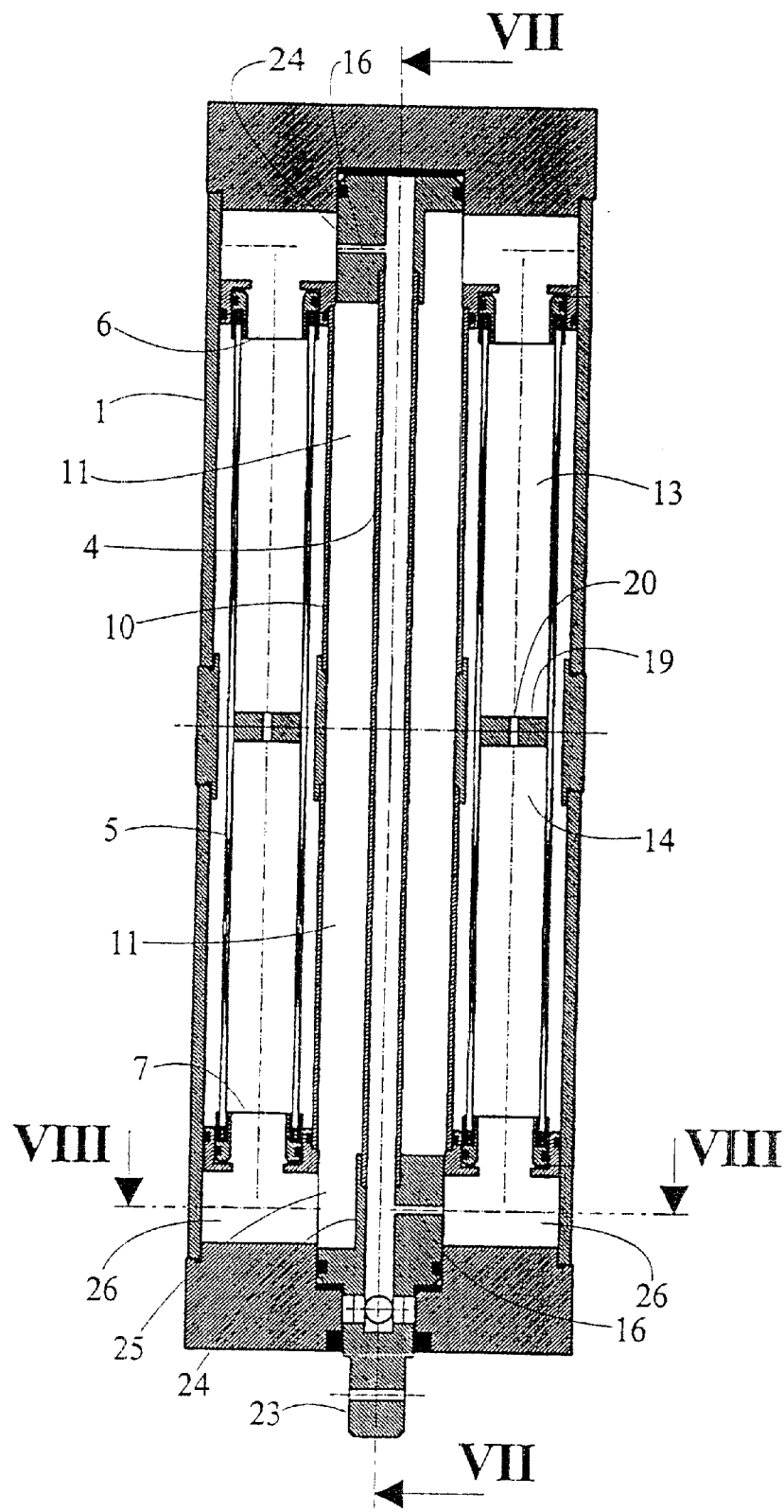
FIG. 6 is a vertical section of a filtering apparatus of the invention, in which the washing organ is arranged into a cylindrical cavity in contact with different filtering elements.
Figure 7:
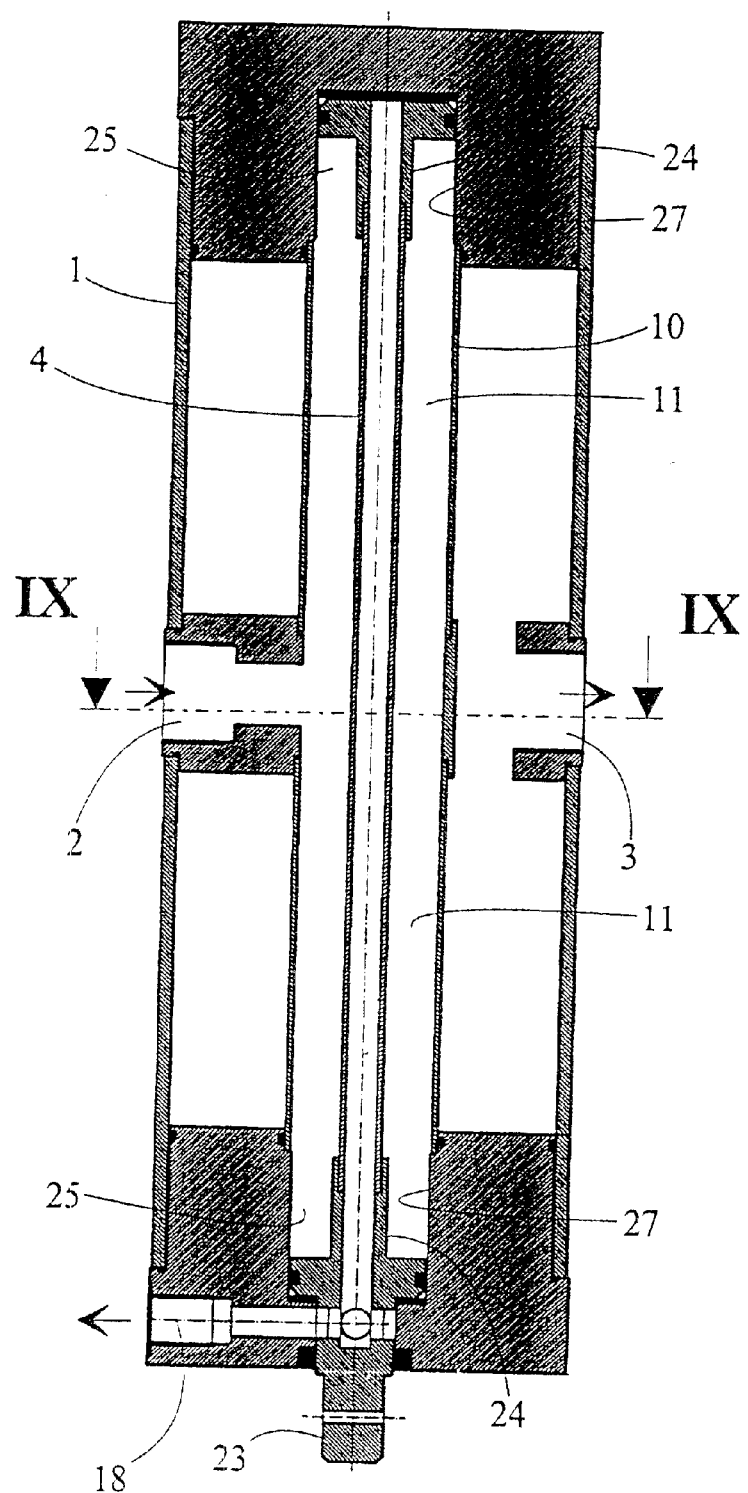
FIG. 7 is a vertical section VII—VII of FIG. 6.
Figure 8:
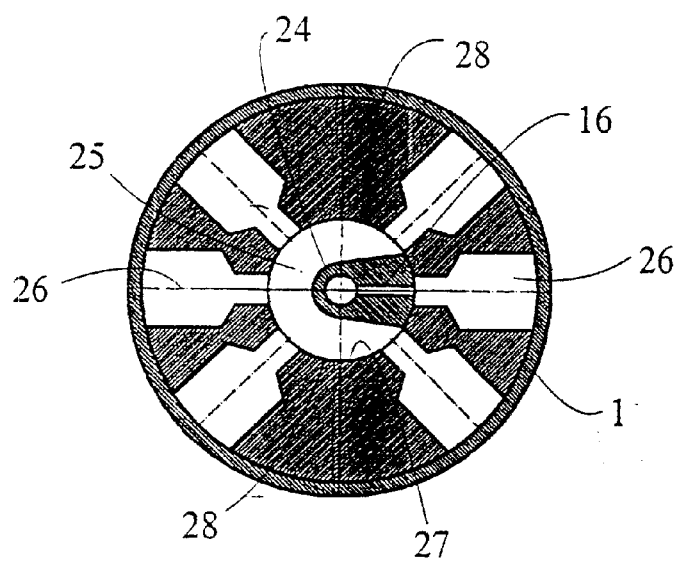
FIG. 8 is a horizontal section VIII—VIII of FIG. 6.
Figure 9:
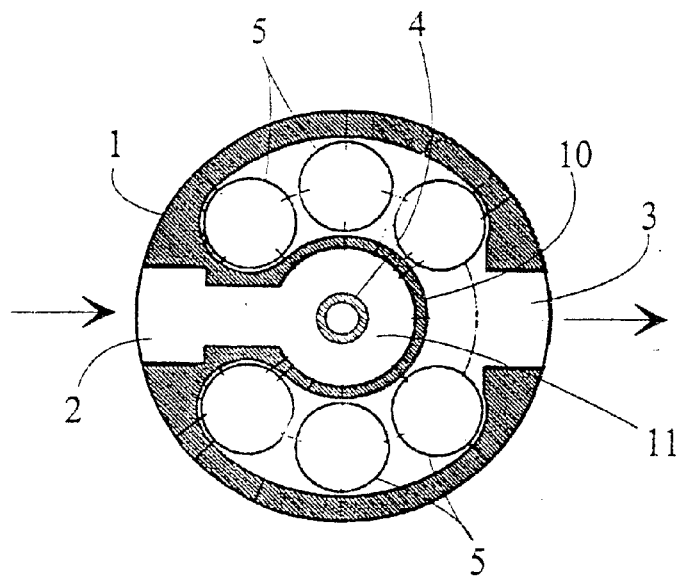
FIG. 9 is a horizontal section IX—IX of FIG. 7.

FIGS. 6–7 present an alternative form of embodiment of the filtering apparatus of the invention, the operation principle of which is similar to the embodiment in FIGS. 1–3. Where applicable, the same reference numbers as in FIGS. 1–3 are used in FIGS. 6–9, and only the constructive features are gone through in the following specification, in which the embodiment in FIGS. 6–9 differs from that in FIGS. 1–3.

In FIG. 7 it may be noted that the inlet channel 2 for the flow to be filtered is arranged in the middle of the apparatus in alignment with the outlet channel 3 for the filtered flow. The inlet channel 2 leads to the flow channel 11 surrounding the middle axle 4 of the apparatus, dividing the incoming flow to be filtered equally in two partial flows extending to the opposite ends of the apparatus. As may best be seen from FIG. 9, the apparatus includes altogether six candle-shaped filtering elements 5, which are all arranged on the same circumference surrounding the middle axle 4. The fastening of the elements 5 is preferably conducted with a slight axial clearance making possible the movement of the element resembling an impulse, as the element is alternately connected to the washing from its opposite ends. Instead of the washing arms 15 according to the embodiment in FIGS. 1–3, the apparatus comprises at both ends a washing organ 24, which is provided with a discharge channel 16 for the washing flow transverse to the axle 4, and which is arranged to rotate with the axle 4 in the cavity 25 forming the end of the channel 11. The cavity 25 is in contact with six chambers 26 arranged corresponding to the placement of the filtering elements 5, the chambers 26 forming a flow connection for the flow to be filtered from the channel 11 to the filtering elements 5.

The washing organ 24, which upon rotating follows the cylindrical surface 27 restricting the cavity 25, is constructed so that it closes one of the chambers 26 at a time from the incoming flow to be filtered by connecting its washing flow to the discharge channel 16 while simultaneously leaving the flow paths open to the five other chambers 26, the filtering going on in the respective filtering elements 5. According to FIG. 8, the washing organ 24 further includes two rest stations 28, in which the washing organ allows the access of the flow to be filtered simultaneously to all six chambers 26 and to the respective filtering elements 5. The said rest stations 28 are situated axially in alignment with the inlet channel 2 for the flow to be filtered and the outlet channel 3 for the filtered flow.

The middle axle 4 and the washing organs 24 at the opposite ends of the apparatus are made of one piece, in which the discharge channels 16 for the washing organs are directed into opposite directions in accordance with FIG. 6. Thus, as one half of each of the filtering elements 5 is at the washing stage, the filtering goes on in the other half of the element. The rotation of the washing organ 24 to the said rest station 28 occurs simultaneously at both ends of the apparatus.

In accordance with FIG. 6, the division in two of the filtering elements 5 is carried out with a choker 19 placed in the middle of each of the elements, the choker consisting of a partition with a small flow opening 20. The opening 20 makes possible the inner flow-through intensifying the backflushing into the half of the filtering element 5 which is being washed at the time.

In the embodiment according to FIGS. 6–9, the device circulating the middle axle 4 and the washing organs 24 of the same piece is preferably a stepping motor (not shown), which is connected to the end 23 of the axle. With the help of the stepping motor, the washing organs 24 at opposite ends of the apparatus may be stopped for a period of desired duration to the rest stations 28 between the washing periods, during which time the washing is running simultaneously in all filtering elements 5 of the apparatus. The arrangement makes it possible to utilise the maximal filtering capacity of the apparatus in a case in which it is not necessary to continuously wash the filtering elements 5.

It is obvious for one skilled in the art that the different embodiments of the invention are not limited to the shown examples, but they may vary within the scope of the enclosed claims.

What is claimed is:

1. A filtering apparatus, comprising an inlet channel for the flow to be filtered, an outlet channel for filtered flow, a number of parallel filtering elements open from both ends, into which flow to be filtered may be directed so that infiltration occurs through an element jacket out of the element, and at least one washing organ connecting alternately to the different ends of the elements at both ends of the filtering elements, the washing organ forming a discharge channel for the backflushing of the elements generated with the pressure of the filtered flow; wherein each of the filtering elements is divided by a partition in two between its ends so that the washing organ connected to the end of each element generates backflushing only for a part of the element length at a time.

2. The filtering apparatus according to claim 1, wherein the washing organs are arranged to connect to the opposite ends of the filtering element at different stages so that, upon washing the one part of the element, the filtering goes on another part of the element.

3. The filtering apparatus according to claim 1, wherein said partition is a solid partition.

4. The filtering apparatus according to claim 1, wherein the interior of the filtering element is constricted between its ends by said partition so that at the constriction there is a narrow flow opening for generating a washing flow-through to a part to be washed in the filtering element.

5. The filtering apparatus according to claim 4, wherein the flow opening is inclined or curved so that the flow opening generates a spiral flow-through to the part to be washed in the element.

6. The filtering apparatus according to claim 1, wherein the washing organ comprises a tubular washing arm transverse to the filtering element.

7. The filtering apparatus according to claim 1, wherein at the opposite ends of the filtering elements, the washing organs are connected to each other to form a piece circulating an axle.

8. The filtering apparatus according to claim 7, wherein the filtering elements are arranged on one or several circumferences around the said axle.

9. The filtering apparatus according to claim 7, wherein the axle is provided with a channel, through which the washing organs at the different ends of the elements are in contact with a discharge assembly.

10. The filtering apparatus according to claim 1, wherein the washing organs are in contact with atmospheric air for generating a washing flow with the pressure difference between the pressure of the filtered flow and the atmospheric pressure.

11. The filtering apparatus according to claim 1, wherein the filtering element is installed in place loosely so that connecting washing suction alternately to different ends of the element transfers the element in a manner resembling an impulse in the axial direction.

12. The filtering apparatus according to claim 1, wherein the apparatus is adapted to filter fuel or lubricating oil of a motor.

* * * * *